(12) United States Patent
Nagasaki

(10) Patent No.: US 8,774,605 B2
(45) Date of Patent: Jul. 8, 2014

(54) DISPLAY PROCESSING APPARATUS, CONTROL METHOD THEREFOR, AND DISPLAY PROCESSING SYSTEM

(75) Inventor: Katsuhiko Nagasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 817 days.

(21) Appl. No.: 12/370,166

(22) Filed: Feb. 12, 2009

(65) Prior Publication Data
US 2009/0214179 A1 Aug. 27, 2009

(30) Foreign Application Priority Data

Feb. 22, 2008 (JP) ................................. 2008-042067

(51) Int. Cl.
*H04N 5/93* (2006.01)
(52) U.S. Cl.
USPC .......................................... 386/289; 348/143
(58) Field of Classification Search
USPC ......................................................... 386/95
See application file for complete search history.

(56) References Cited

U.S. PATENT DOCUMENTS

| | | | | |
|---|---|---|---|---|
| 5,600,368 A | * | 2/1997 | Matthews, III | ............... 348/143 |
| 5,956,037 A | * | 9/1999 | Osawa et al. | .................. 345/418 |
| 2002/0105598 A1 | * | 8/2002 | Tai et al. | ........................ 348/705 |
| 2003/0051256 A1 | * | 3/2003 | Uesaki et al. | .................. 725/144 |
| 2004/0204911 A1 | * | 10/2004 | Kubo | ............................ 702/187 |
| 2005/0154598 A1 | * | 7/2005 | Kanayama et al. | ............... 705/1 |

FOREIGN PATENT DOCUMENTS

| | | |
|---|---|---|
| JP | 9-046688 A | 2/1997 |
| JP | 2004-32341 | 1/2004 |
| JP | 2005-101980 A | 4/2005 |
| JP | 2005-191949 A | 7/2005 |
| JP | 2005-260512 | 9/2005 |

* cited by examiner

*Primary Examiner* — Carl Colin
*Assistant Examiner* — Syed Zaidi
(74) *Attorney, Agent, or Firm* — Fitzpatrick, Cella, Harper & Scinto

(57) ABSTRACT

A display apparatus receives video data and plays back the received video data in real time. The display apparatus records history information indicating user operations performed in relation to video display when the video data is being played back and the operation time. Subsequently, to redisplay the video data, the display apparatus acquires appropriate video data from an external apparatus and plays back the video data in real time while reproducing the user operations indicated by history information, according to operation times.

14 Claims, 18 Drawing Sheets

DISPLAY PROCESSING APPARATUS, CONTROL METHOD THEREFOR, AND DISPLAY PROCESSING SYSTEM

BACKGROUND OF THE INVENTION

1. Field of the Invention

The present invention relates to (a) a display processing apparatus, which is connected with one or more video delivery apparatus and video recording apparatus, and which displays video, (b) a control method for the display processing apparatus, and (c) a display processing system.

2. Description of the Related Art

A content processing system has been proposed which accumulates videos shot by a plurality of video cameras and related information and allows a viewer to view the same video each time together with the related information synchronized with the video (see Japanese Patent Laid-Open No. 2005-260512).

Also, a video terminal apparatus has been proposed which records a plurality of videos delivered from video delivery apparatus, together with time information and displays the videos for playback by synchronizing the videos with one another (see Japanese Patent Laid-Open No. 2004-032341).

However, with the technique described in Japanese Patent Laid-Open No. 2005-260512, only operations performed on the videos and information by deliverers are recorded, and viewers are not given leeway. For example, even if a plurality of viewers display a video by performing various types of image processing on the video using their own display terminal apparatus, it is impossible to reproduce display conditions afterwards.

On the other hand, with the technique described in Japanese Patent Laid-Open No. 2004-032341, videos are recorded on each terminal apparatus, requiring the terminal apparatus to have massive recording capacity.

SUMMARY OF THE INVENTION

The present invention has been made in view of the above circumstances and its exemplary embodiments provides an apparatus and a method which allow a video displayed before to be displayed again under the same conditions as before on each display terminal apparatus without a substantial increase in recording capacity.

According to one aspect of the present invention, there is provided a display processing apparatus comprising a reception unit configured to receive video data, a display processing unit configured to perform real-time display processing of the video data received by the reception unit, a recording unit configured to record history information about user operations and operation times of the user operations, the user operations being related to video display and performed during the display processing of the video data by the display processing unit, and a playback control unit configured to redisplay the video data by making the reception unit and the display processing unit play back appropriate video data acquired from an external apparatus and reproducing the user operations indicated by the history information, according to the operation times.

Also, according to another aspect of the present invention, there is provided a control method for a display processing apparatus comprising a reception step of receiving video data, a display processing step of performing real-time display processing of the video data received by the reception step, a recording step of recording history information about user operations and operation times of the user operations, the user operations being related to video display and performed during the display processing of the video data by the display processing step, and a playback control step of redisplaying the video data by executing the reception step and the display processing step to play back appropriate video data acquired from an external apparatus and by reproducing the user operations indicated by the history information, according to the operation times.

Furthermore, according to another aspect of the present invention, there is provided a display processing system which includes a video delivery apparatus, a video recording apparatus which records video delivered from the video delivery apparatus, a display processing apparatus which performs display processing of the video delivered from the video delivery apparatus and the video recording apparatus, comprising a reception unit which receives video data delivered from the video delivery apparatus, a display processing unit which performs real-time display processing of the video data received by the reception unit, a recording unit which records history information about user operations and operation times of the user operations, the user operations being related to video display and performed during the display processing of the video data by the display processing unit, and a playback control unit which redisplays the video data by playing back appropriate video data acquired from an external apparatus and reproducing the user operations indicated by the history information, according to the operation times.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings.

First Embodiment

Figure 2:
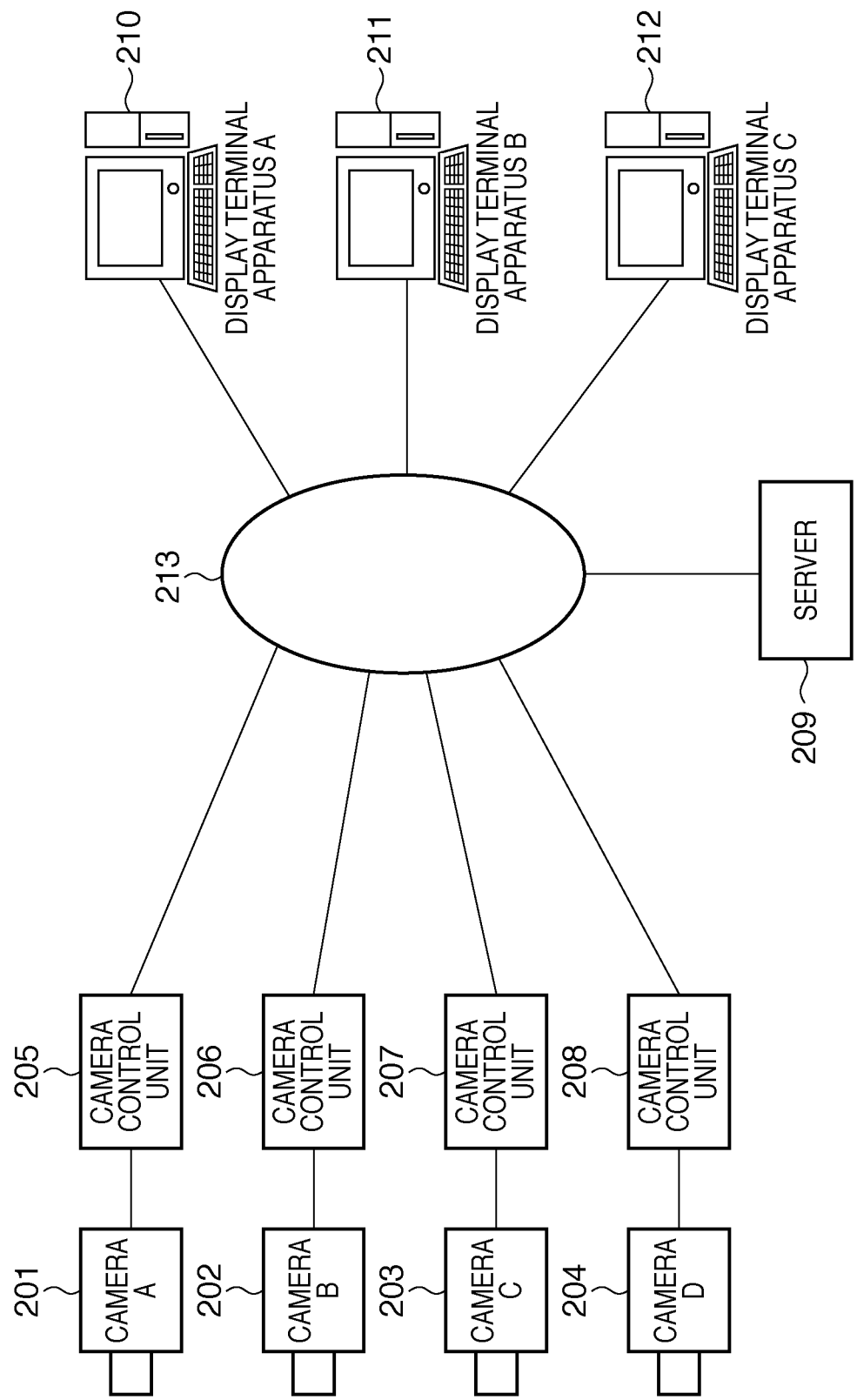
FIG. 2 is diagram showing an exemplary system configuration according to the first embodiment.

FIG. 2 is a diagram showing an exemplary configuration of a display processing system which includes a display terminal apparatus (display processing apparatus) according to a first embodiment. Reference numerals 201 to 204 denote cameras A to D serving as image capturing units. Reference numerals 205 to 208 denote camera control units which control camera A 201 to camera D 204, respectively, and deliver videos to a network. The cameras A 201 to D 204 and camera control units 205 to 208 are included in a video delivery apparatus. However, if a camera has a function to deliver videos to a network 213 as in the case of the camera control units 205 to 208, the camera can function as a video delivery apparatus. Reference numeral 209 denotes a server functioning as a video recording apparatus which records videos. Reference numerals 210 to 212 denote display terminal apparatus A to C. Reference numeral 213 denotes the network.

Figure 1:
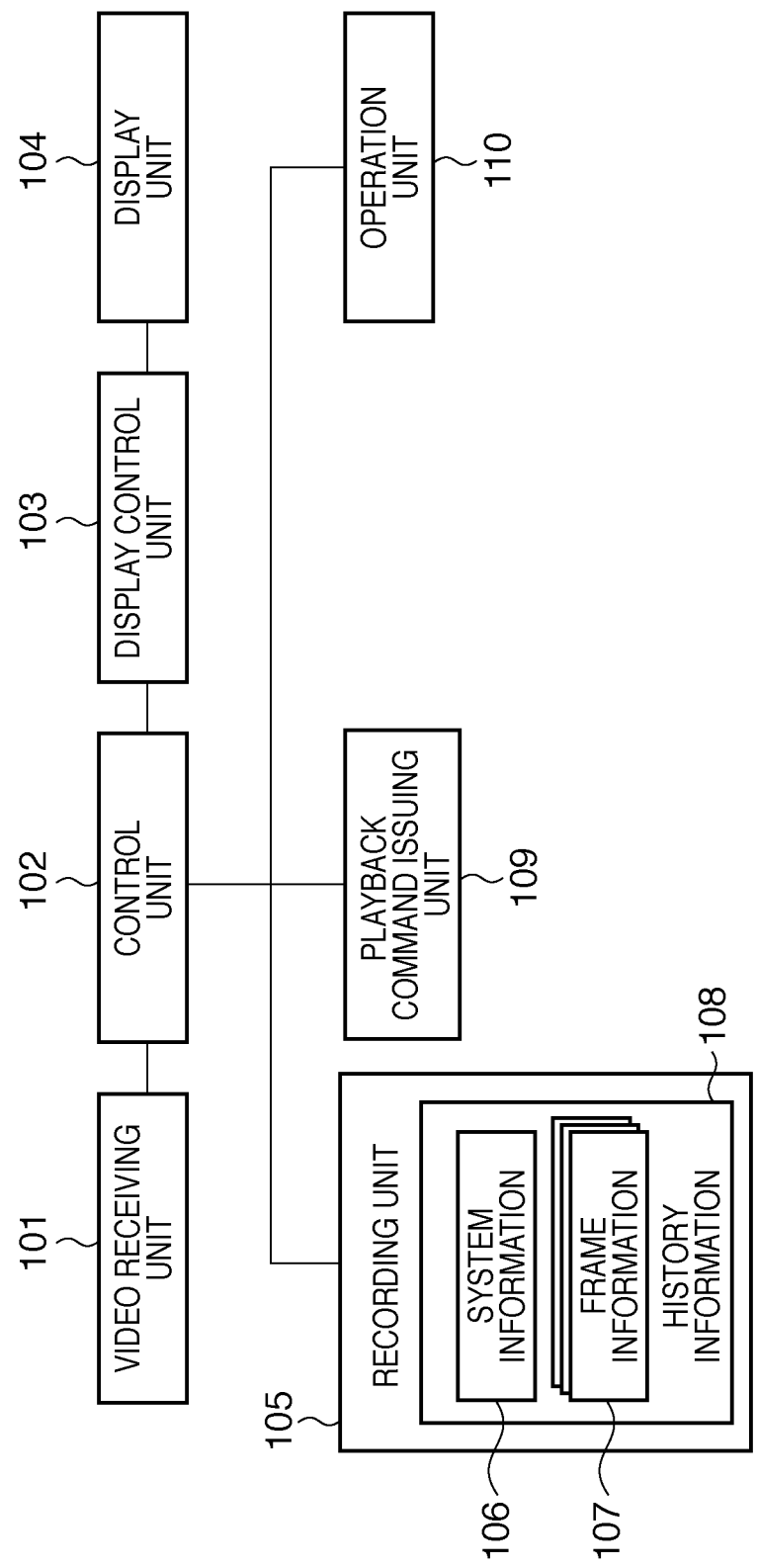
FIG. 1 is block diagram showing an exemplary hardware configuration of a display terminal apparatus according to a first embodiment.

FIG. 1 is a block diagram showing an exemplary hardware configuration of display terminal apparatus A 210 to C 212 according to the present embodiment.

In FIG. 1, reference numeral 101 denotes a video receiving unit which receives video data, 102 denotes a control unit which controls the entire apparatus, 103 denotes a display control unit which controls display, and 104 denotes a display unit which displays video. The display unit 104 may be able to play back audio data accompanying the video data. That is, the display unit 104 functions as a playback apparatus which plays back the received video data in order for a user to watch and listen to the video data. Reference numeral 105 denotes a recording unit which stores history information 108 including system information 106 and frame information 107. The frame information 107 will be described later with reference to FIG. 4. Reference numeral 109 denotes a playback command issuing unit which generates and issues a playback command based on information from the recording unit 105. Reference numeral 110 denotes an operation unit operated by the user to select a video or perform image processing.

Figure 14:
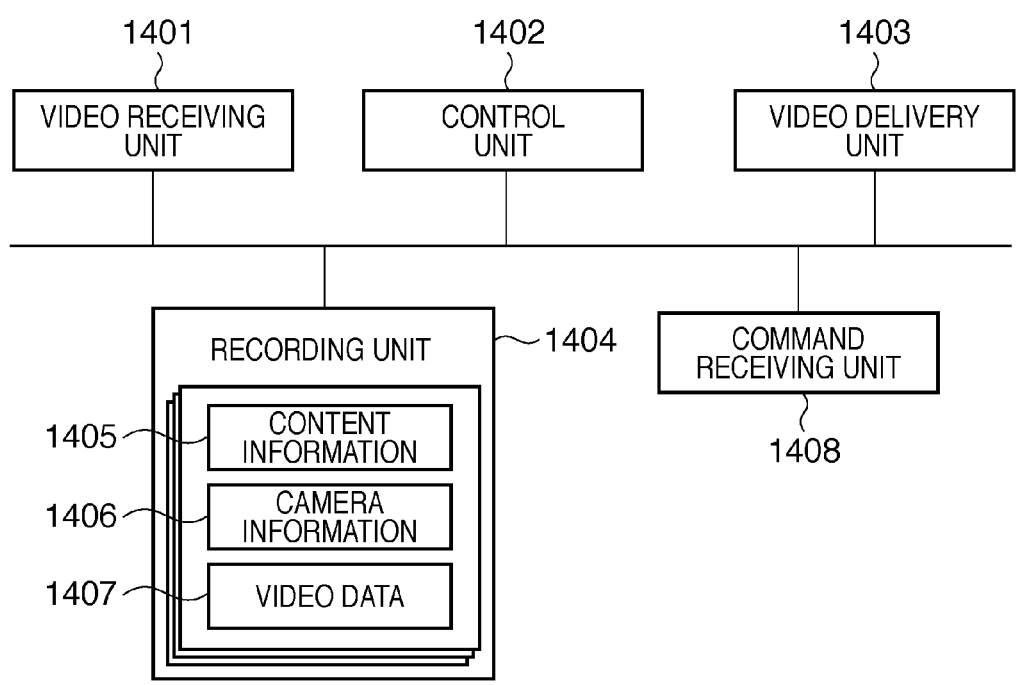
FIG. 14 is block diagram showing an exemplary hardware configuration of a video recording apparatus according to the first embodiment.

FIG. 14 is a block diagram showing an exemplary hardware configuration of the server 209 functioning as a video recording apparatus according to the present embodiment.

Reference numeral 1401 denotes a video receiving unit which receives video data and content information from the camera control units 205 to 208 serving as video delivery apparatus via the network 213. Reference numeral 1402 denotes a control unit which controls all the video delivery apparatus, and 1403 denotes a video delivery unit which delivers video to display terminal apparatus. The content information 1405 is information about content (e.g., "Video Conference A" or "Monitoring the Server Room and its Vicinity") including a content ID, start time and end time of the content, and video data ID which is included in the content ID. Video data contained in the content may be obtained using a plurality of cameras specified in advance. Incidentally, according to the first embodiment, each content ID corresponds to multiple streams of video data. Reference numeral 1404 denotes a recording unit which records received video data 1407, the content information 1405, and server information which includes an IP address (not shown) of the server. The recording unit 1404 further records camera information 1406. Reference numeral 1408 denotes a command receiving unit which receives commands from display terminal apparatus A 210 to C 212. The camera information 1406, which is information about the camera from which the video data is received, includes a camera ID number, available video sizes, and an IP address of the camera.

(Operation of Live Video Display Processing)

Figure 3:
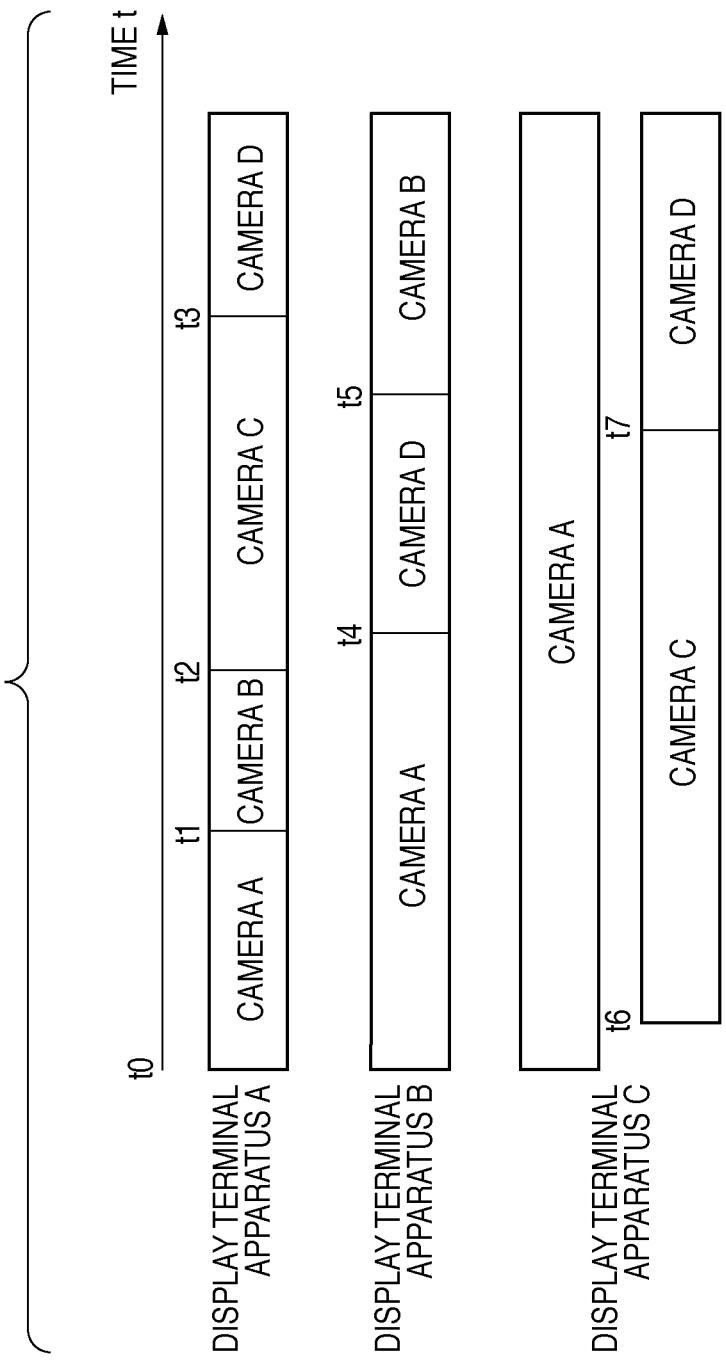
FIG. 3 is diagram showing examples of operations performed to display live video on each display terminal apparatus according to the first embodiment.

The control unit 102 of each display terminal apparatus displays the video data received by the video receiving unit 101, in real time by controlling the display control unit 103 and display unit 104. Playback of video data will be described below taking video display processing as an example, but this is not restrictive. For example, if video data is accompanied by audio data, needless to say, the audio may be played back when images are displayed. Also, although live video display processing is described taking as an example streaming playback of video data delivered from the video delivery apparatus, the display processing is also applicable to streaming playback of video data delivered from the server 209. Incidentally, according to the present embodiment, the term "streaming playback" means the act of playing back video data in sequence while receiving the video data. As shown in FIG. 3, it is assumed that display terminal apparatus A 210 to C 212 are receiving video data from cameras A 201 to D 204 and displaying video data selected from the received video data. Display terminal apparatus A 210 selects video data from camera A 201 from time t0 to t1, video data from camera B 202 from time t1 to t2, video data from camera C 203 from time t2 to t3, and video data from camera D 204 after time t3. Display terminal apparatus B 211 selects video data from camera A 201 from time t0 to t4, video data from camera D 204 from time t4 to t5, and video data from camera B 202 after time t5.

Display terminal apparatus A 210 and B 211 is displaying video on a single screen, but display terminal apparatus C 212 displays video on double screens from halfway (after t6). Display terminal apparatus C 212 selects video data from camera A 201 for one of the windows from time t0 onward. For the other window, display terminal apparatus C 212 selects video data from camera C from time t6 to t7 and video data from camera D after t7.

Figure 4:
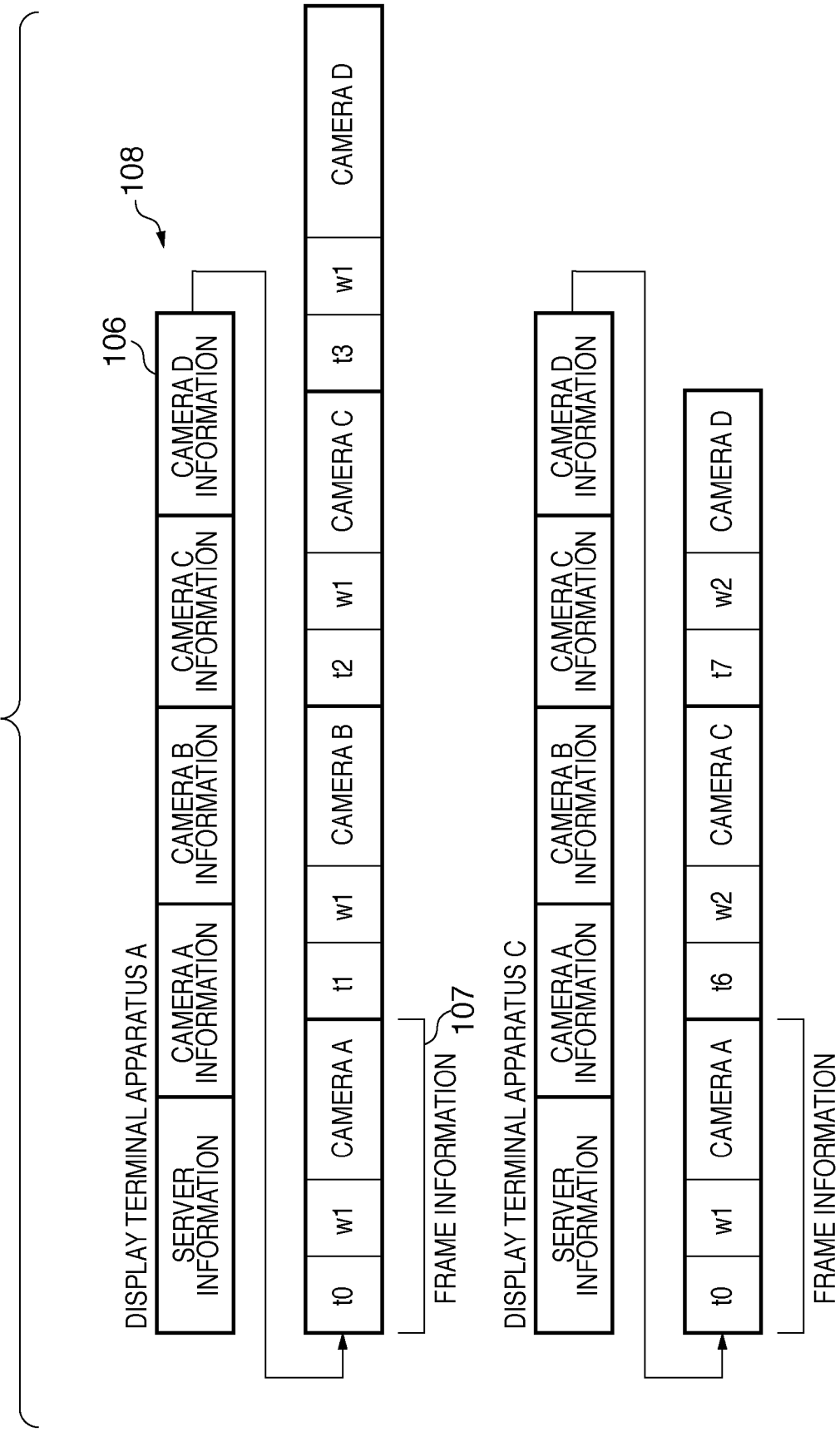
FIG. 4 is diagram showing an exemplary recording format of history information according to the first embodiment.

Video is selected using the operation unit 110. An exemplary format of the system information 106 recorded in the recording units 105 of display terminal apparatus A 210 and display terminal apparatus C 212 is shown in FIG. 4. The same format is applied to display terminal apparatus B 211, although B is not illustrated.

Herein, the system information 106 includes server information and camera information as shown in FIG. 4. The server information includes information about the server 209 such as the IP address and the content information 1405 (described above) such as the content ID and the start time of the content. The camera information includes the ID number of the camera, available sizes of video, and IP address of the camera as described above. On the other hand, the frame information 107 includes a set of information: time information about the time at which the user performed an operation, a window ID used to identify a window, the camera information about the camera which has generated the video data. According to the present embodiment, the frame information 107 is recorded in time sequence during a video data recording process. The window ID (w1, w2) represents a window number on each display terminal apparatus. For example, only one window ID (i.e., w1) is shown in the case of display terminal apparatus A 210 and display terminal apparatus B 211, each of which has a single window. On the other hand, w1 and w2 are shown in the case of display terminal apparatus C 212.

Figure 5:
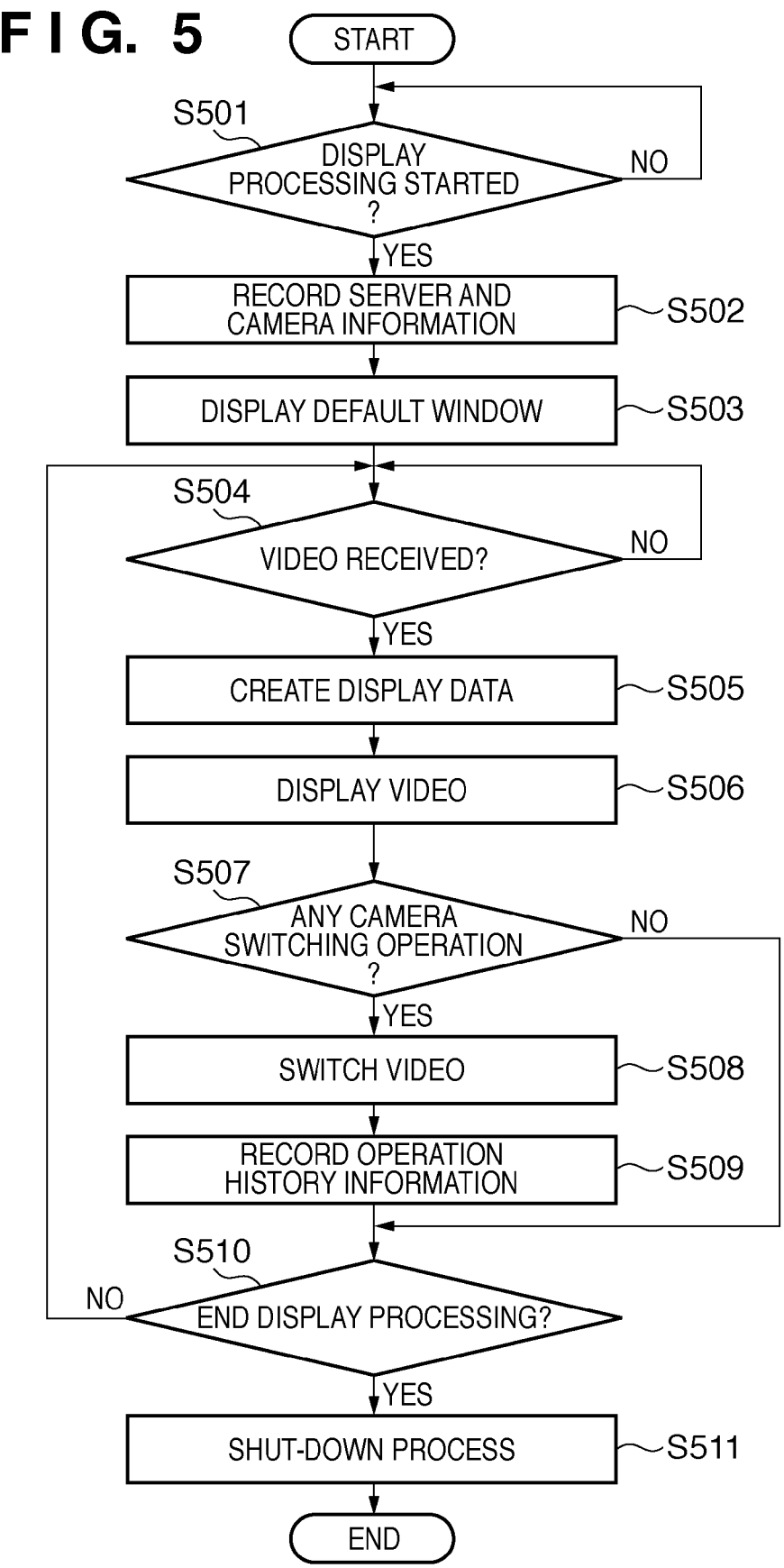
FIG. 5 is an operation flowchart of live video display processing on the display terminal apparatus according to the first embodiment.

FIG. 5 is a flowchart showing operation of live video display processing on display terminal apparatus A 210, B 211, or C 212. The process described below is implemented as a CPU (not shown) of the control unit 102 of display terminal apparatus A 210, B 211, or C 212 executes a program stored in memory (not shown) such as a ROM or RAM.

When it is determined in step S501 that display processing has been started, the control unit 102 goes to step S502 to record server information and camera information as the system information 106 in the recording unit 105. The server information and camera information used as the system information 106 have been collected from the server 209 and the camera control units 205 to 208 by the control unit 102 via the network 213. Next, in step S503, the control unit 102 makes the display control unit 103 display a video display window in the display unit 104. The window displayed at this time is a default window of a predetermined default window size.

When video data is received by the video receiving unit 101 in step S504, the control unit 102 generates display data from the video data in step S505. Specifically, the control unit 102 generates the display data by integrating and decoding compression-encoded, packetized data. In step S506, the control unit 102 passes the generated display data to the display control unit 103 and the display control unit 103 displays the received display data in such a way as to fit in the window displayed in the display unit 104.

In step S507, the control unit 102 determines whether a camera switching operation has been performed via the operation unit 110. If a camera switching operation has been performed, the control unit 102 switches to another video (camera) in step S508 based on the camera switching operation. In step S509, the control unit 102 records history of the camera switching operation as the history information 108 in the recording unit 105 using the format shown in FIG. 4. In this way, the control unit 102 records the history information including the user operation and its operation time, the user operation being related to video display and performed during the live video display processing. According to the present embodiment, frame information is generated each time a user operation is performed. In the present embodiment, the operation of switching the video (camera) to be played back has been cited as an example of a user operation.

In step S510, the control unit 102 determines whether directions to end the display have been given via the operation unit 110. If no such directions have been given, the control unit 102 returns to step S504 to wait for a next video to be received. If directions to end the display have been given, the control unit 102 goes to step S511 to perform a shut-down process, such as closing the window, to finish processing.

Figure 15:
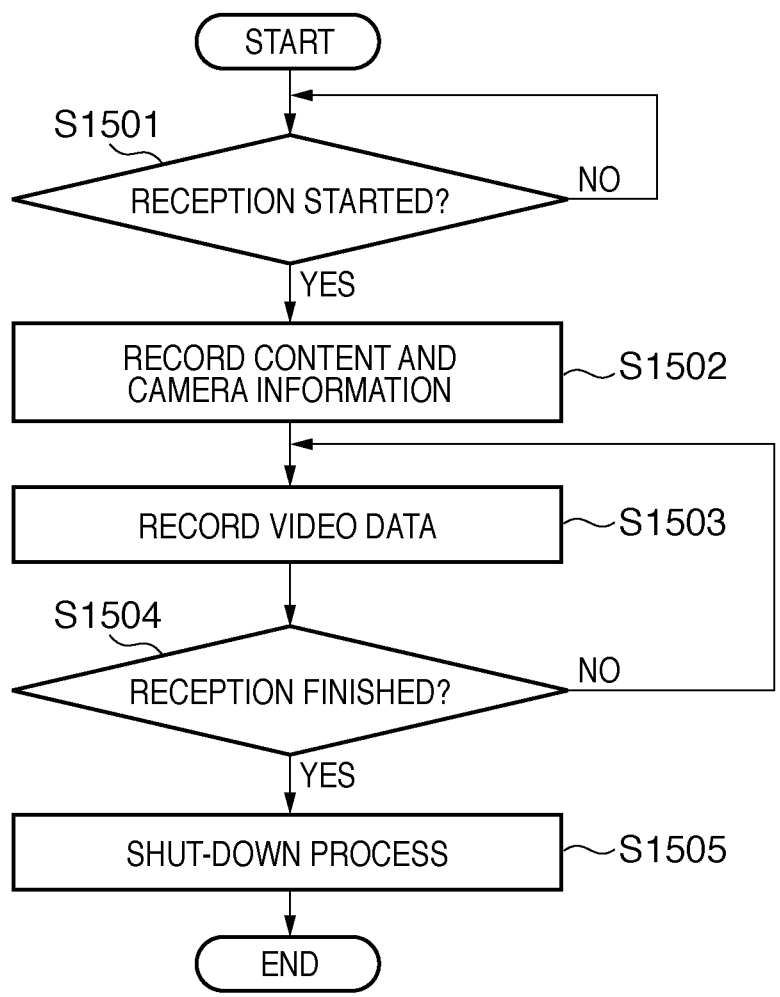
FIG. 15 is an operation flowchart of live video display processing on the video recording apparatus according to the first embodiment.

Next, operation of the server 209 functioning as a video recording apparatus will be described with reference to an operation flowchart in FIG. 15. When video data starts to be received in step S1501 from the camera control units 205 to 208 serving as video delivery apparatus, the control unit 1402 goes to step S1502. In step S1502, the control unit 1402 records the content information 1405 and camera information 1406 in the recording unit 1404. In step S1503, the control unit 1402 records the video data 1407 in sequence. The content information 1405 includes the start time of the content. When the reception of the video data is finished in step S1504, the control unit 1402 performs a shut-down process, such as recording the end time of the content and closing a file in step S1505, to finish processing. The server 209 can perform the above operations for each video delivery apparatus and concurrently for plural video delivery apparatus. Note that times related to the video data recorded by the server 209 need to be synchronized with times such as t0 and t1 contained in the history information 108. This can be done, for example, using a frame number or time contained in each frame of the video data. In that case, for example, t1 in FIG. 3 includes the frame number of the video data from camera A at that time and the frame number of the video data from camera B at that time. This makes it possible to identify the frames of camera A and camera B at that time (t1).

(Redisplay Operation)

Description will be given of redisplay operation performed when the history information 108 shown in FIG. 4 is recorded in the recording unit 105. Although display terminal apparatus C 212 is taken as an example, the same applies to the other display terminal apparatus as well.

Figure 6:
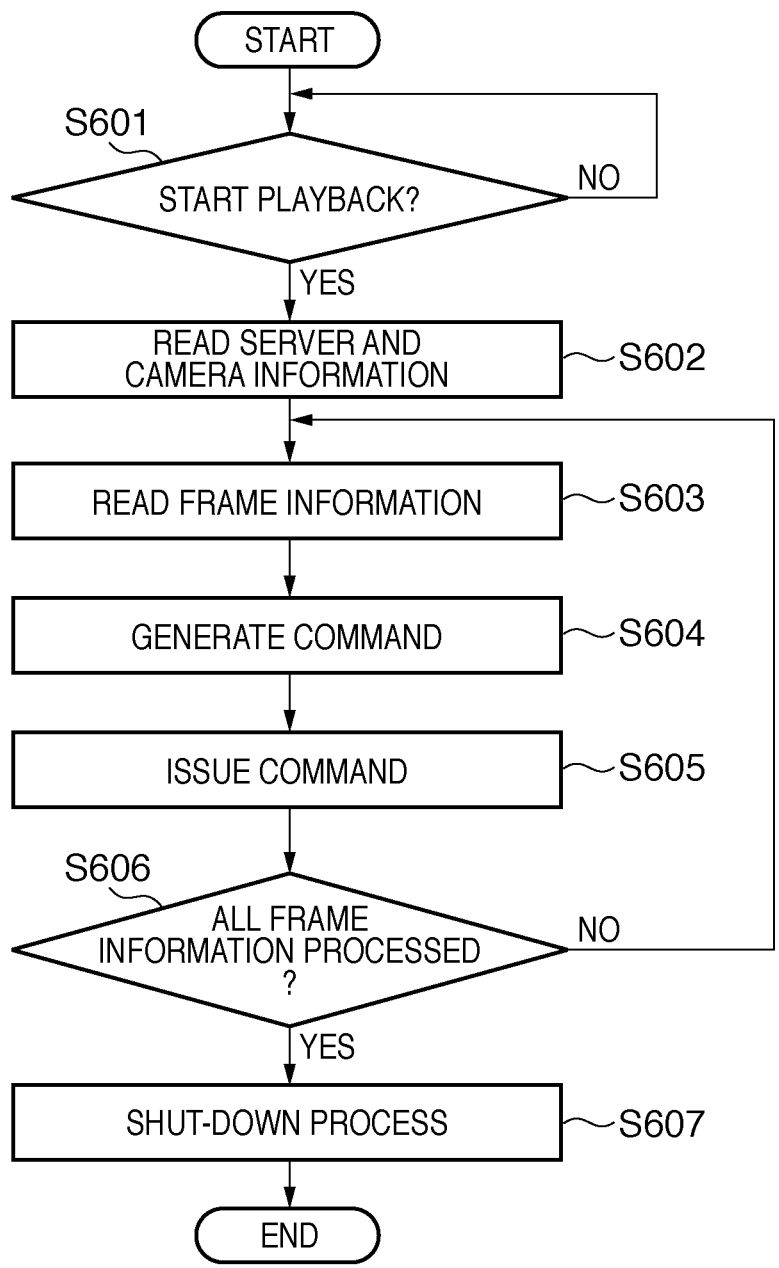
FIG. 6 is an operation flowchart of video data acquisition for redisplay on the display terminal apparatus according to the first embodiment.
Figure 7:
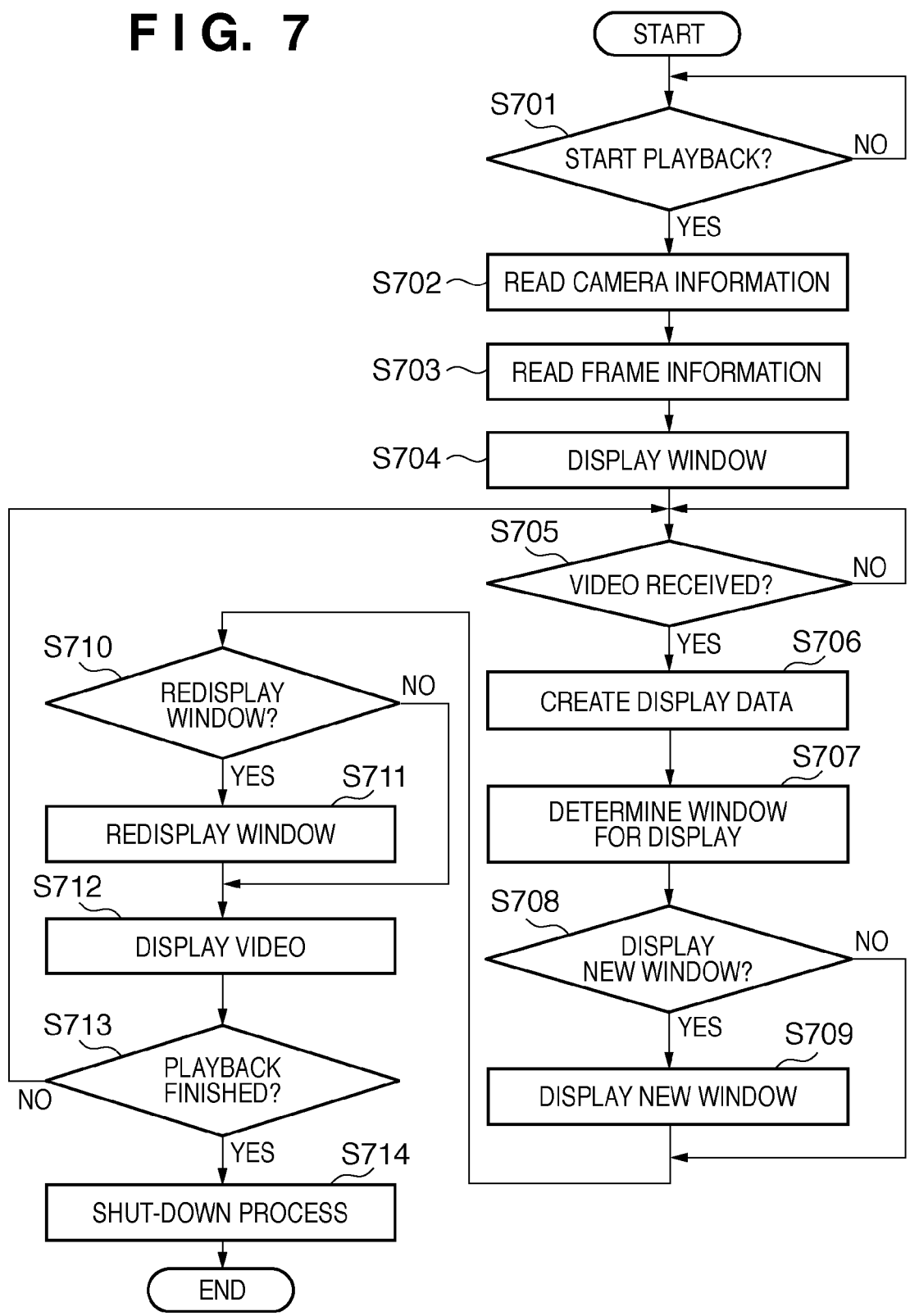
FIG. 7 is an operation flowchart showing how acquired video data is displayed on the display terminal apparatus according to the first embodiment.

The redisplay operation on display terminal apparatus A 210 to C 212 will be described below with reference to operation flowcharts in FIGS. 6 to 7. During redisplay, the control unit 102 controls playback as follows. Specifically, based on the history information 108, the control unit 102 acquires the video data to be redisplayed from an external apparatus (e.g., the server 209) and makes the display control unit 103 stream the video data in the display unit 104. While playing back the video data, the control unit 102 reproduces user operations indicated by the history information 108 in order of operation times. Playback control performed by the control unit 102 will be described in detail below. FIG. 6 is a flowchart showing operation performed by the display terminal apparatus to acquire video data to be redisplayed. FIG. 7 is a flowchart showing operation performed by the display terminal apparatus to play back (display) the acquired video data in real time. First, description will be given with reference to FIG. 6.

When the user specifies content the user wants to view again and gives directions to redisplay the content via the operation unit 110, the control unit 102 accepts the directions and goes from step S601 to step S602. If multiple pieces of history information are stored in the recording unit 105, the control unit 102, for example, lists content, allowing the user to select desired content. In step S602, the control unit 102 reads the server information and camera information out of the system information 106 contained in the history information 108 of the specified content. In step S603, the control unit 102 reads the first piece of frame information 107 out of the recording unit 105.

Next, in step S604, the control unit 102 makes the playback command issuing unit 109 generate a command used to acquire video data generated by the camera described in the frame information read in step S603. In step S605, the control unit 102 makes the playback command issuing unit 109 issue the command, and thereby acquires the video. In step S606, the control unit 102 determines whether any frame information 107 is left in the history information 108. If there is any remaining frame information 107, the control unit 102 returns to step S603 and repeats the processes described above for a next piece of frame information 107. If there is no remaining frame information 107, the control unit 102 goes to step S607 and performs a shut-down process to finish the processing. Incidentally, when the frame information 107 is read in step S603, information about the window (hereinafter referred to as window information) has been stored separately in the recording unit 105. In the case of display terminal apparatus C 212, which uses two windows w1 and w2, two sets of window information have been stored in the recording unit 105. The window information is used for video data display described next.

Next, operation performed by the display terminal apparatus to display acquired video data will be described with reference to FIG. 7.

When the user specifies desired content and gives directions to redisplay the content, upon receiving the directions from the operation unit 110 in step S701, the control unit 102 goes to step S702. In step S702, the control unit 102 acquires video size information from the camera information contained in the history information 108 of the specified content. Also, in step S703, the control unit 102 reads the first piece of frame information 107. Next, in step S704, the control unit 102 displays a window for video display in the display unit 104 based on the video size information and frame information 107.

When the video receiving unit 101 receives video data in step S705, the control unit 102 generates video data for display from the received video data in step S706. In step S707, with reference to the display window ID contained in the frame information 107, the control unit 102 determines in which window the received video data will be displayed. If the control unit 102 determines in step S708 that it is necessary to display a new window, the control unit 102 makes the display control unit 103 additionally display a new window in the display unit 104 in step S709. Thus, in the case of a display terminal apparatus with only a single window, steps S707 to S709 are omitted. Next, in step S710, the control unit 102 determines whether it is necessary to redisplay (resize) the window in displaying the video data. If it is determined that the window needs to be redisplayed, the control unit 102 makes the display control unit 103 redisplay the window in step S711, and then goes to step S712. If it is not necessary to redisplay the window, the control unit 102 goes to step S712 directly. When the window is redisplayed, the window is displayed in a new size if it becomes necessary to resize the window, for example, after the video (camera) is switched.

In step S712, the control unit 102 passes the video display data generated in step S706 to the display control unit 103 so that the video will be displayed on the appropriate one of the windows displayed in the display unit 104.

In step S713, the control unit 102 determines whether all the video data has been displayed (playback has been finished). The determination is made based on whether there is any frame information subsequent to the frame information 107 corresponding to the video data currently displayed. If it is found with reference to the history information 108 that there is subsequent frame information, the above redisplay operation is continued. The control unit 102 switches video data when the first operation time arrives after the start of video playback. If video size differs from the previous one, the window is further resized.

For example, in the case of display terminal apparatus A in FIG. 4, when the playback time reaches operation time t1, the display switches to the video data of camera B. Subsequently, the display switches to the video data of camera C at t2, and to the video data of camera D at t3.

If all the video data has been displayed, the control unit 102 performs a shut-down process, such as closing the window, in step S714 to finish the processing. If all the video data has not been displayed yet, the control unit 102 returns to step S705 to wait for next video data to be received.

Figure 16:
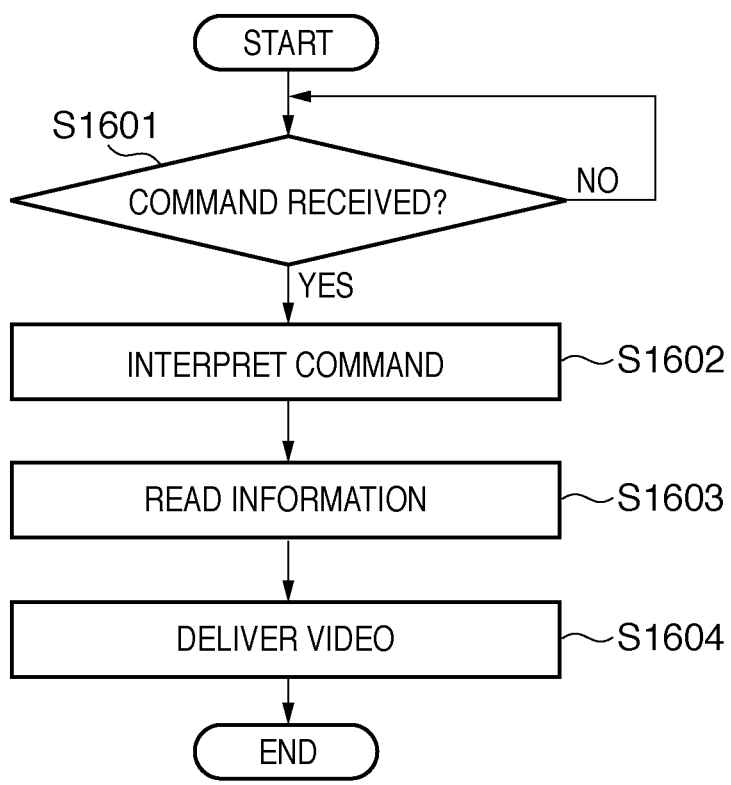
FIG. 16 is an operation flowchart of redisplay on the video recording apparatus according to the first embodiment.

Next, operation of the server 209 functioning as a video recording apparatus will be described with reference to an operation flowchart in FIG. 16.

The control unit 1402 of the server 209 determines in step S1601 whether the command receiving unit 1408 has received a command from an external display terminal apparatus. If it is determined that a command has been received, the control unit 1402 goes to step S1602. In step S1602, the control unit 1402 interprets the command received by the command receiving unit 1408. Next, in step S1603, the control unit 1402 reads the video data and camera information requested by the command based on the results of interpretation in step S1602. In step S1604, the control unit 1402 delivers the video data and camera information via the video delivery unit 1403.

The above configuration makes it possible to redisplay a video which has been displayed once, using almost the same recording capacity as conventional display terminal apparatus. That is, in display control according to the present embodiment, the control unit 102 issues a command to the server 209 according to a video (camera) switching operation indicated in the history information and thereby switches the video data received by the video receiving unit 101. This makes it possible to display video according to user operations as in the case of live video display processing.

Second Embodiment

In the example described according to the first embodiment, the operation of selecting among plural cameras is recorded as history information 108 on the display terminal apparatus, but user operations to be recorded are not limited to selection operations. In a second embodiment, description will be given of a case in which user operations include video processing operations, such as trimming and resizing, with respect to the video being displayed. In this case, playback control by the control unit 102 involves performing video processing on the video data received by the video receiving unit 101, according to video processing operations indicated in the history information 108 and displaying the processed video data in the display unit 104. In the second embodiment, description will be given of an example in which a video trimming (clipping) operation and resizing (resolution conversion) operation can be added to the history information 108 in addition to camera selection operations.

Figure 17:
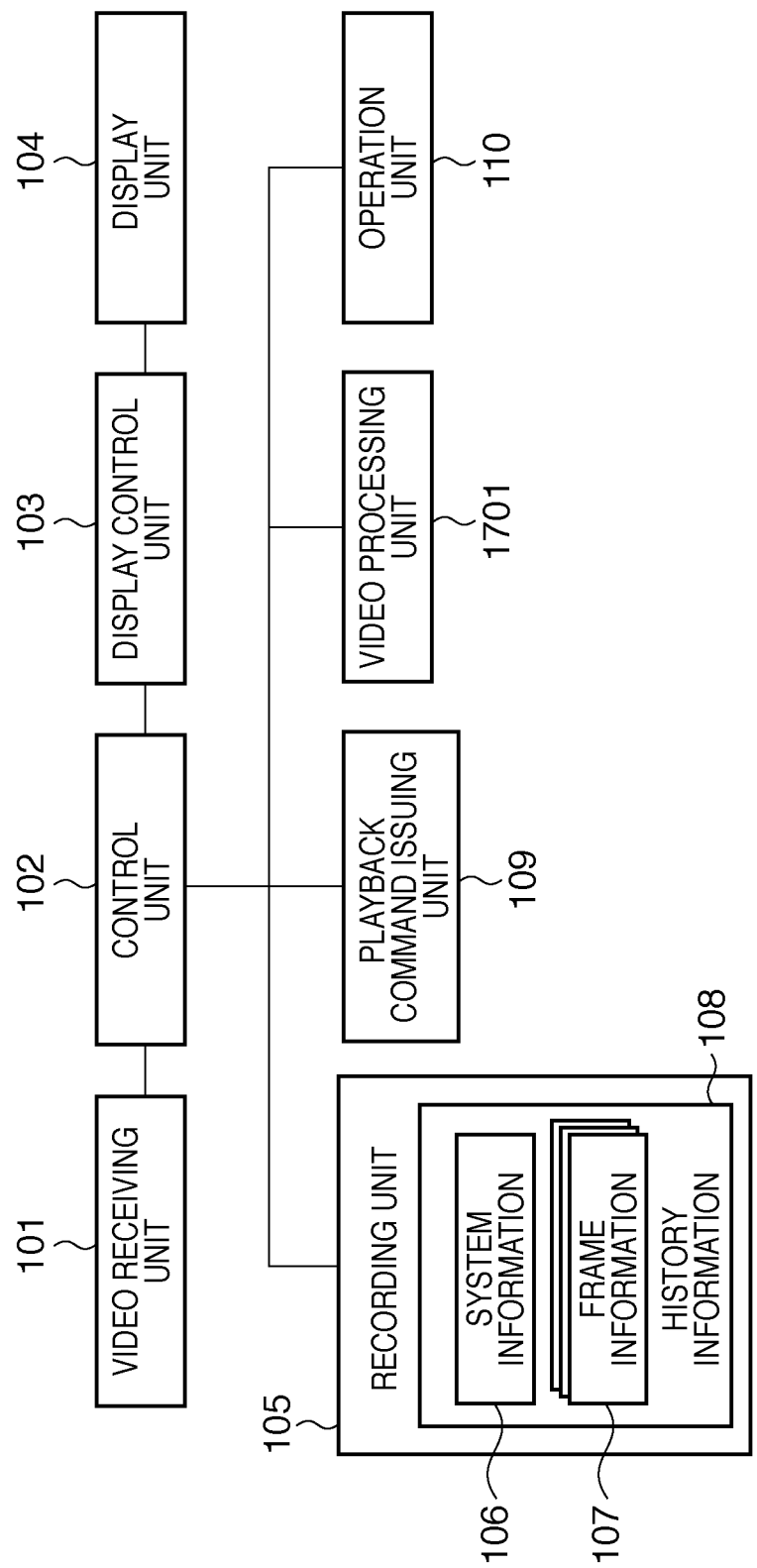
FIG. 17 is block diagram showing an exemplary hardware configuration of the display terminal apparatus according to the second embodiment.

FIG. 17 is a block diagram showing an exemplary hardware configuration of a display terminal apparatus according to the second embodiment, which differs from the display terminal apparatus according to the first embodiment (FIG. 1) in that a video processing unit 1701 has been added. In response to user directions from the operation unit 110, the video processing unit 1701 trims or resizes received video. Incidentally, configuration of the system including the display terminal apparatus is the same as the first embodiment (FIG. 2).

(Operation of Live Video Display Processing)

Figure 8:
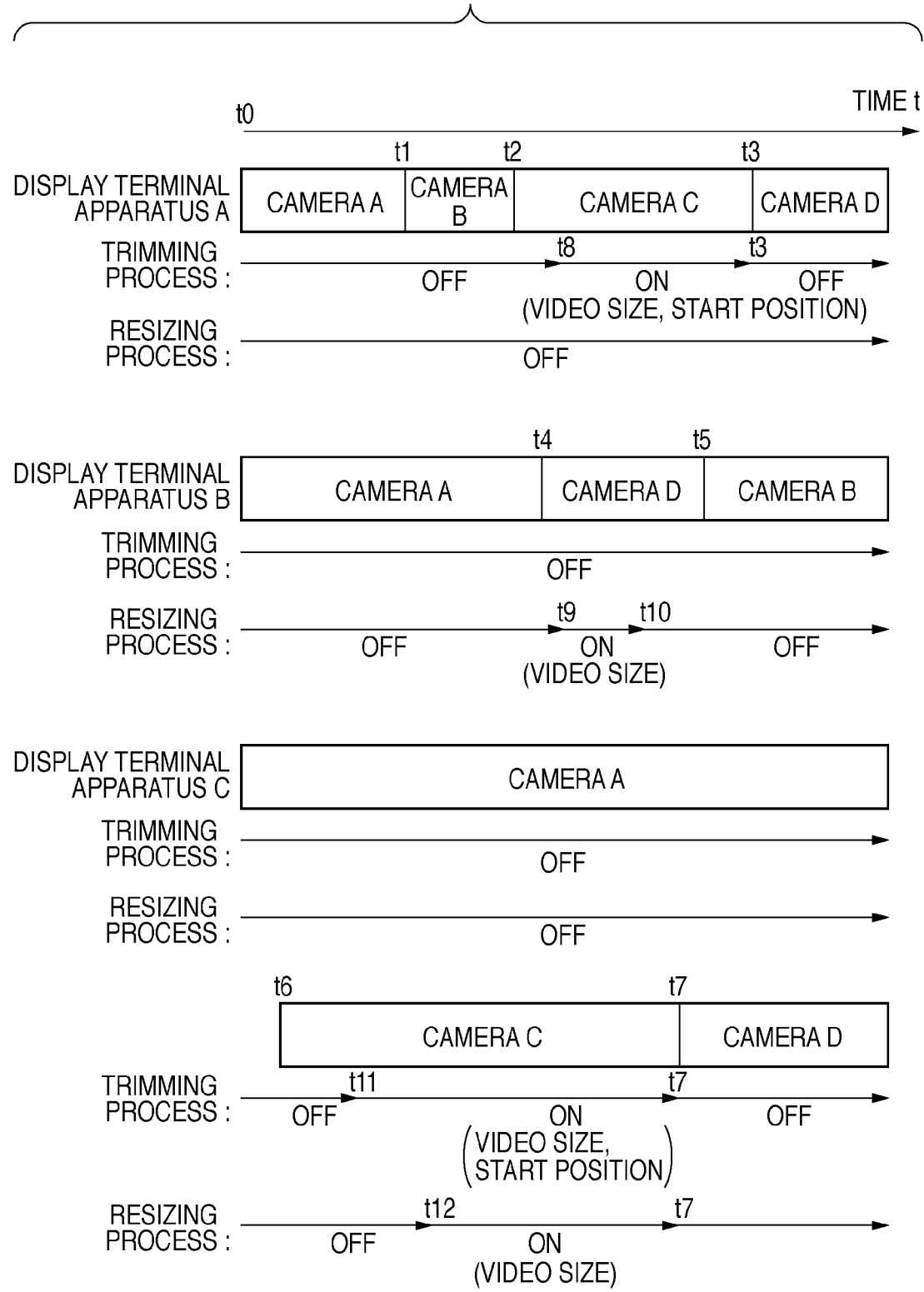
FIG. 8 is diagram showing examples of operations performed on each display terminal apparatus according to a second embodiment.
Figure 9:
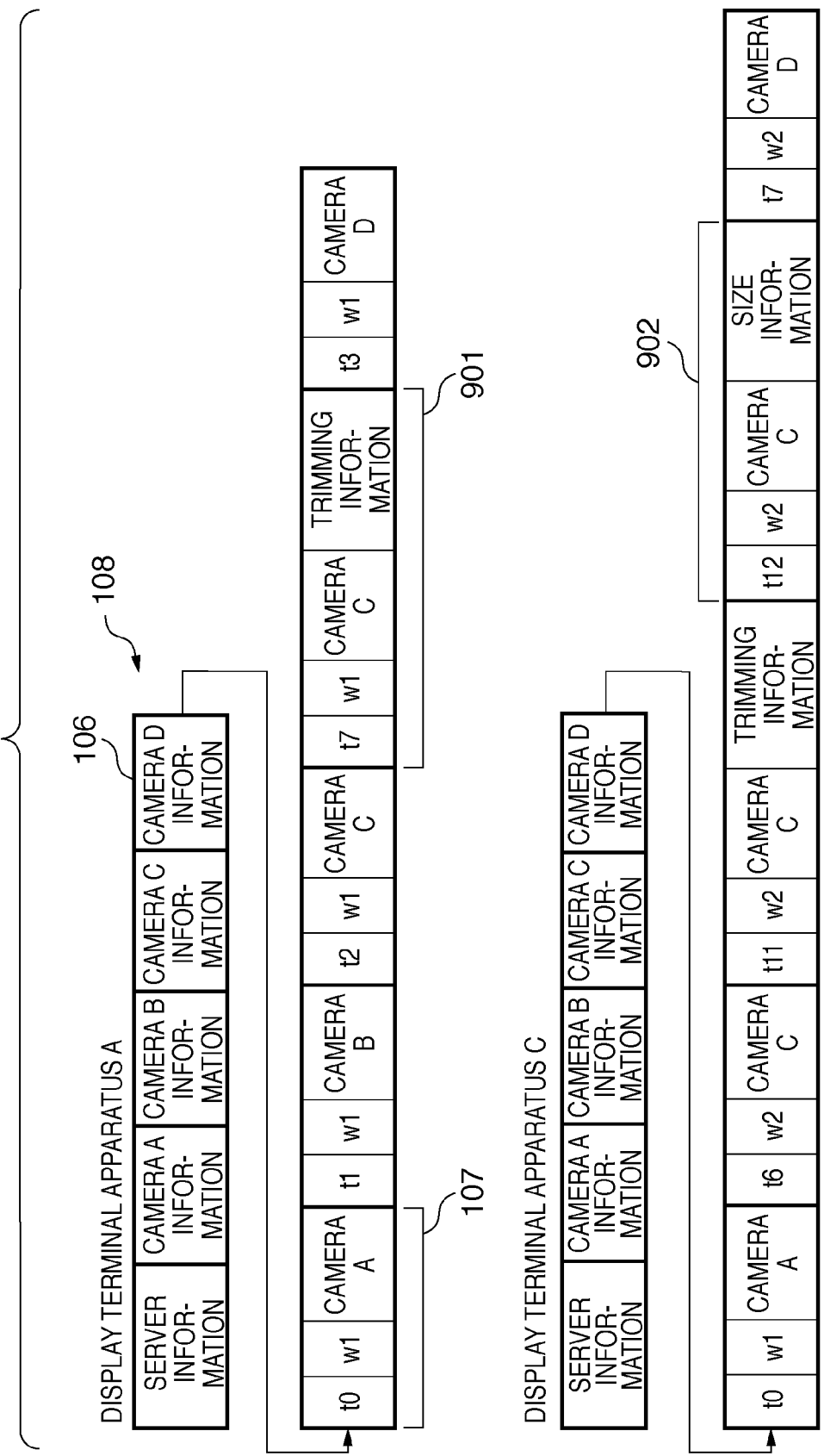
FIG. 9 is diagram showing an exemplary recording format of history information according to the second embodiment.

FIGS. 8 and 9 show an example of operations performed on each display terminal apparatus and an exemplary format of the history information 108 recorded in the recording units 105 of display terminal apparatus A 210, B 211 and C 212, respectively, according to the second embodiment.

Referring to FIG. 8, on display terminal apparatus A 210, camera A 201 is selected from t0 to t1. Camera B 202 is selected from t1 to t2, camera C 203 is selected from t2 to t3, and camera D 204 is selected after t3. Also, from t8 to t3, display terminal apparatus A 210 displays the video data from camera C 203 by trimming the video data.

On display terminal apparatus B 211, camera A 201 is selected from t0 to t4, camera D 204 is selected from t4 to t5, and camera B 202 is selected after t5. Also, from t9 to t10, the video data from camera D 204 is displayed by being resized.

On display terminal apparatus C 212, the video data from camera A 201 is selected in one of the windows from t0 onward. In the other window, camera C 203 is selected from t6 to t7 and camera D 204 is selected after t7. From t11 to t7, the video data from camera C 203 is displayed by being trimmed. Furthermore, from t12 to t7, the video data from camera C 203 is displayed by being resized in addition to being trimmed.

The recording format shown in FIG. 9 is approximately the same as in the first embodiment (FIG. 4). In the case of video data subjected to a trimming or resizing process, information about the trimming or resizing process is additionally recorded as frame information such as denoted by 901 and 902 in FIG. 9. The trimming process is the process of clipping and extracting video data on the screen and the resizing process is the process of thinning data. Information about the trimming process includes the start and end times of the trimming process as well as trim position and size on the video. Information about the resizing process includes the start and end times of the resizing process as well as size of the video data after resizing.

Figure 10:
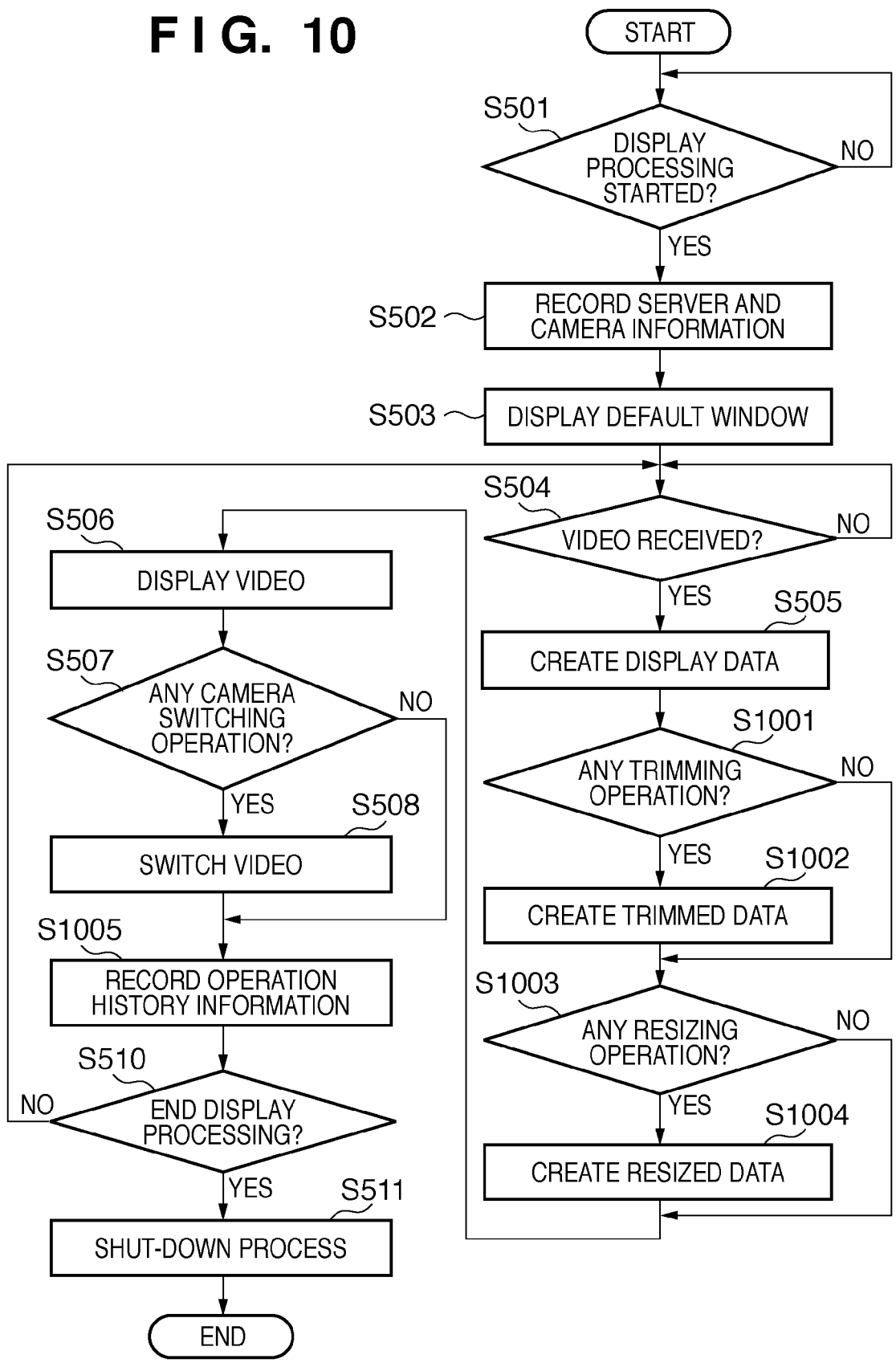
FIG. 10 is an operation flowchart of live video display processing on the display terminal apparatus according to the second embodiment.

FIG. 10 is a flowchart showing operation of live video display processing on the display terminal apparatus according to the second embodiment. Steps equivalent to those in the operation flowchart according to the first embodiment are assigned the same step numbers as corresponding steps in the first embodiment, and description thereof will be omitted.

After video data for display is generated in step S505, the control unit 102 goes to step S1001. In step S1001, the control unit 102 of the display terminal apparatus determines whether the user has performed a trimming operation via the operation unit 110 by specifying post-trimming video size and trimming start coordinates. If it is determined that a trimming operation has been performed, the control unit 102 makes the video processing unit 1701 create trimmed data from the display data in step S1002 based on the provided information. Then, the control unit 102 goes to step S1003. If it is determined that no trimming operation has been performed, the control unit 102 goes directly to step S1003 from step S1001.

In step S1003, the control unit 102 determines whether the user has performed a resizing operation via the operation unit 110 by specifying post-resize video size. If a resizing operation has been performed, the control unit 102 makes the video processing unit 1701 create resized data from the display data in step S1004 based on the provided information. Then, the control unit 102 goes to step S506. If no resizing operation has been performed, the control unit 102 goes directly to step S506 from step S1003. Since the trimming and resizing processes are known techniques, description thereof will be omitted herein.

After step S508 or if the determination in step S507 is negative, the control unit 102 goes to step S1005. If at least one of the trimming operation, resizing operation, and camera switching operation has been performed, the control unit 102 record the performed operation in step S1005 using the format in FIG. 9.

(Operation of Redisplay Processing)

Operation of a redisplay processing with the history information shown in FIG. 9 recorded in the recording unit 105 will be described next.

Figure 11:
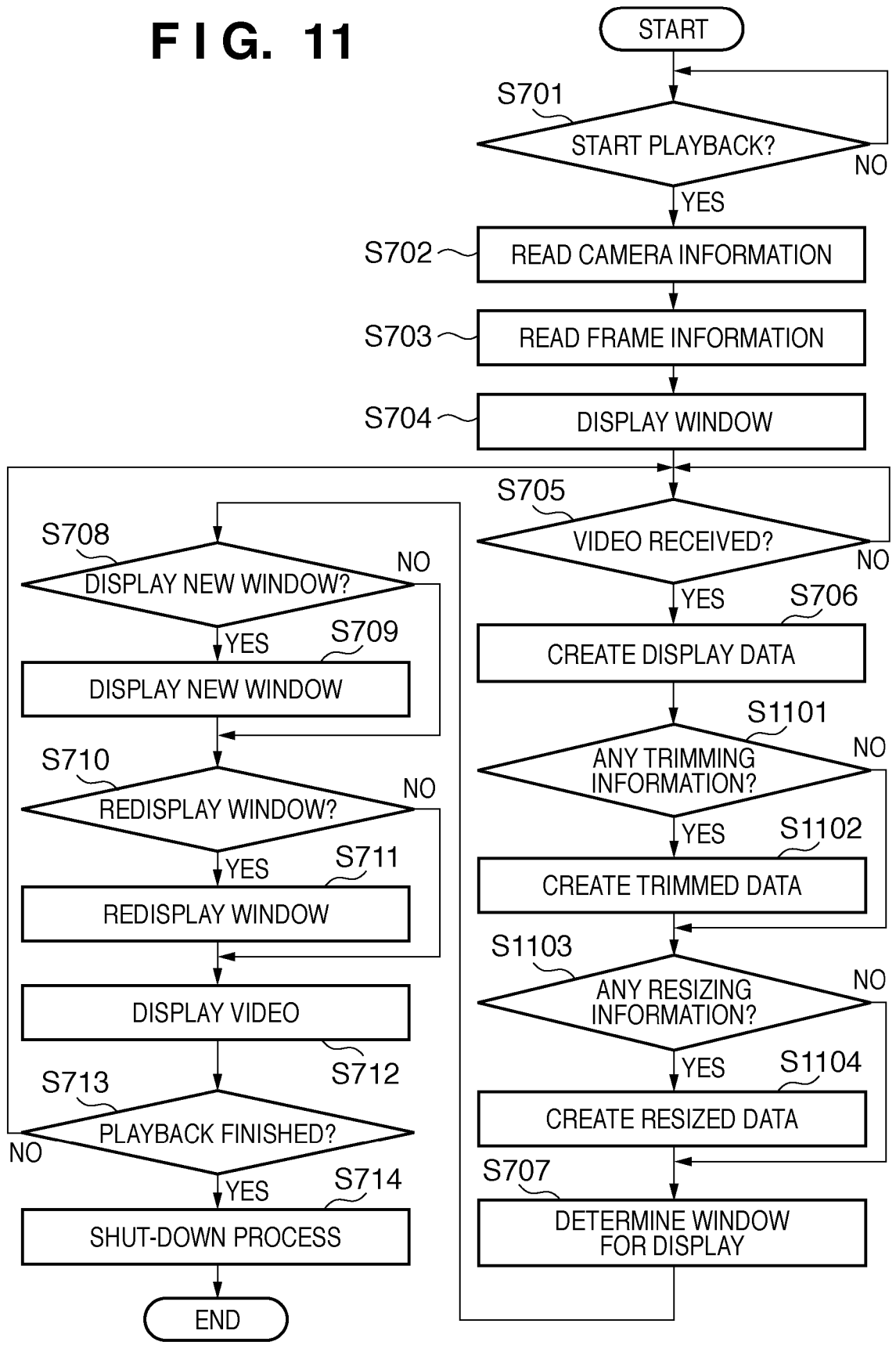
FIG. 11 is an operation flowchart showing how acquired video data is displayed on the display terminal apparatus according to the second embodiment.

FIG. 11 is a flowchart showing operation performed by the display terminal apparatus according to the second embodiment to display acquired video data. Steps carried out to acquire video data for redisplay is the same as in the first embodiment (steps S701 to S706).

Referring to FIG. 11, after step S706, the control unit 102 goes to step S1101. In step S1101, the control unit 102 determines whether trimming information is contained in the appropriate frame information. If trimming information is contained, the control unit 102 goes to step S1102. In step S1102, the control unit 102 makes the video processing unit 1701 perform a trimming process based on the trimming information read out of the frame information to generate trimmed data. Then, the control unit 102 goes to step S1103. If trimming information is not contained in the frame information, the control unit 102 goes directly to step S1103 from step S1101.

In step S1103, the control unit 102 determines whether resizing information is contained in the frame information. If resizing information is contained, the control unit 102 goes to step S1104. In step S1104, the control unit 102 makes the video processing unit 1701 perform a resizing process based on the resizing information read out of the frame information to generate resized data. Then, the control unit 102 goes to step S707. If resizing information is not contained in the frame information, the control unit 102 goes directly to step S707 from step S1103. The video subjected to the trimming process and resizing process is displayed in the display unit 104 in step S712. Incidentally, if it becomes necessary to redisplay the window as a result of the trimming or resizing, the window is redisplayed in step S711.

The above configuration makes it possible to reproduce not only camera selections on a display terminal apparatus, but also trimming and resizing processes performed on acquired video data.

Although a system with four cameras is assumed in the present embodiment, this is not restrictive, of course. In the case of a system with a single camera, in particular, since there is no need to select a camera, it is possible to omit recording the information about a selected camera in the frame information. Also, even if plural cameras are used, when video from all the cameras is displayed and subjected to the same operations, it is also possible to omit recording the information about the selected cameras.

<Variation>

Although in the second embodiment, trimming and resizing processes are performed on the display terminal apparatus after video data is acquired, this is not restrictive. For example, when specifying video data, the display terminal apparatus can generate and issue a command to the server 209, the command containing instructions for video processing such as trimming and/or resizing. Upon receiving the command, the server 209 performs the specified video processing on the specified video data to generate processed video data. A process similar to the redisplay processing described above can be implemented by displaying the processed video data received from the server 209 on the display terminal apparatus.

Figure 18:
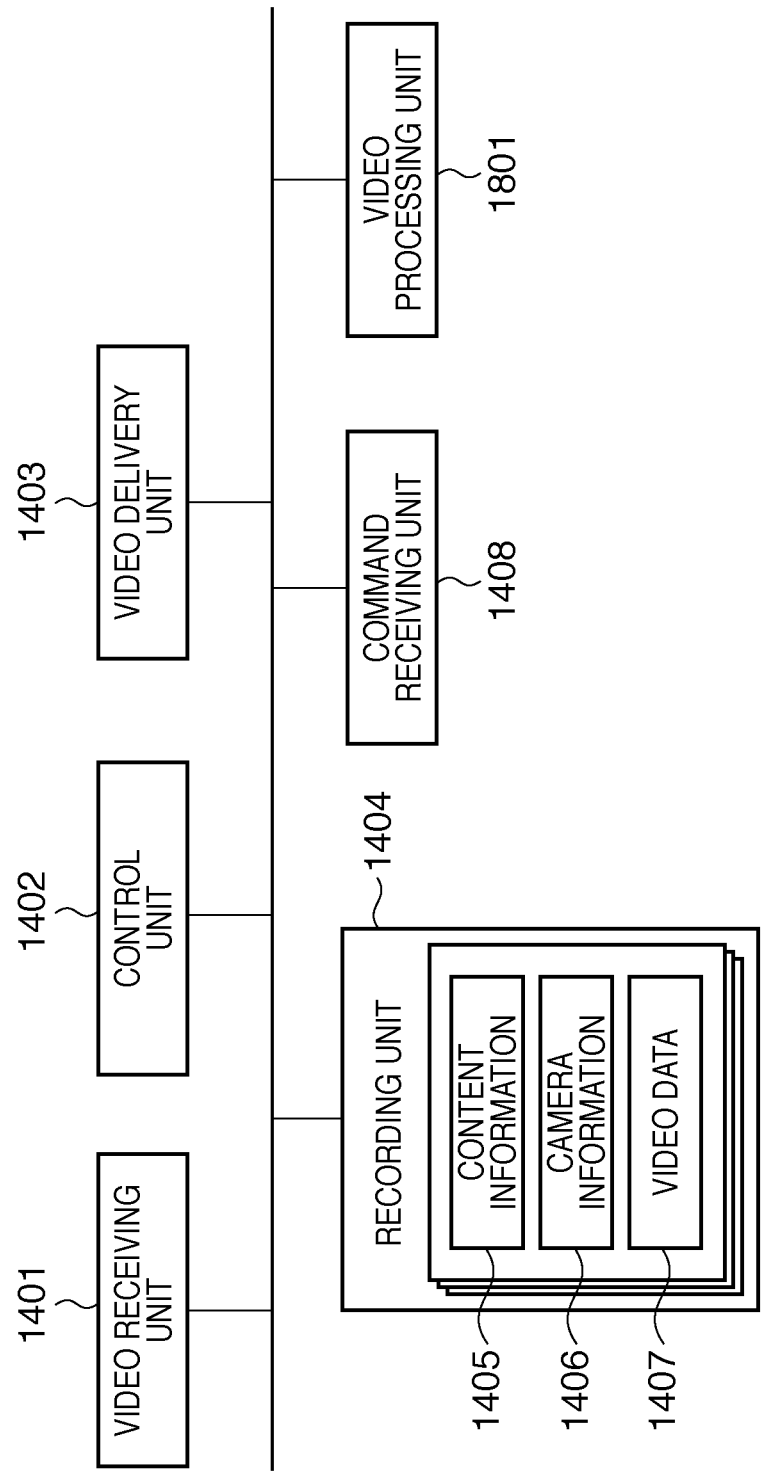
FIG. 18 is block diagram showing an exemplary hardware configuration of a video recording apparatus according to a variation of the second embodiment.

FIG. 18 is a block diagram showing an exemplary hardware configuration of the server 209 (video recording apparatus) designed to perform a trimming process and resizing process. The configuration includes a video processing unit 1801 in addition to the configuration of the first embodiment (FIG. 14). Upon receiving a command containing instructions for video processing such as trimming and/or resizing, the control unit 1402 passes the video data specified by the command to the video processing unit 1801 in order for the video processing unit 1801 to perform the specified video processing (trimming and/or resizing).

Thus, in playback control according to the variation of the second embodiment, when user operations include a video processing operation with respect to the video being displayed, the control unit 102 issue a command to perform the video processing, based on the video processing operation indicated in the history information 108. The command is issued to the external apparatus which is a delivery source of the video data to be received by the video receiving unit 101, i.e., to the server 209. As described above, the display terminal apparatus receives and displays the video data processed by the external apparatus according to the command specifying the video processing.

The variation of the second embodiment described above makes it possible to realize live video display more reliably. For example, after a video is displayed live on a display terminal apparatus equipped with the video processing unit 1701, the video can be reproduced on another display terminal apparatus without a video processing unit 1701. That is, conditions of live video display can be reproduced on a display terminal apparatus different from the one on which the video was displayed live.

Third Embodiment

In the first and second embodiments described above, it is assumed each camera can deliver a single size of video. However, a camera which can deliver plural sizes of video is conceivable.

Figure 12:
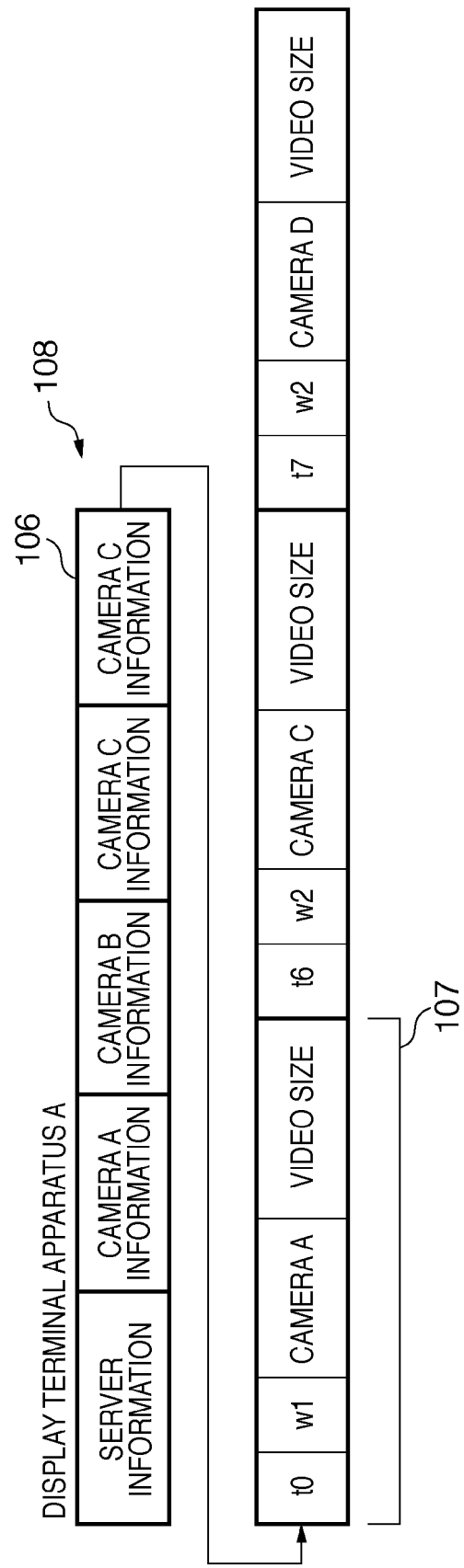
FIG. 12 is diagram showing an exemplary recording format of history information according to a third embodiment.

An exemplary recording format of the history information 108 used in such a case is shown in FIG. 12. The camera information in the system information 106 contains the ID number of the camera, a plurality of available sizes of video, and IP address of the camera. On the other hand, the frame information 107 contains, time information, a display window ID, information about a selected camera (camera ID), and information about the size of video to be received.

Figure 13:
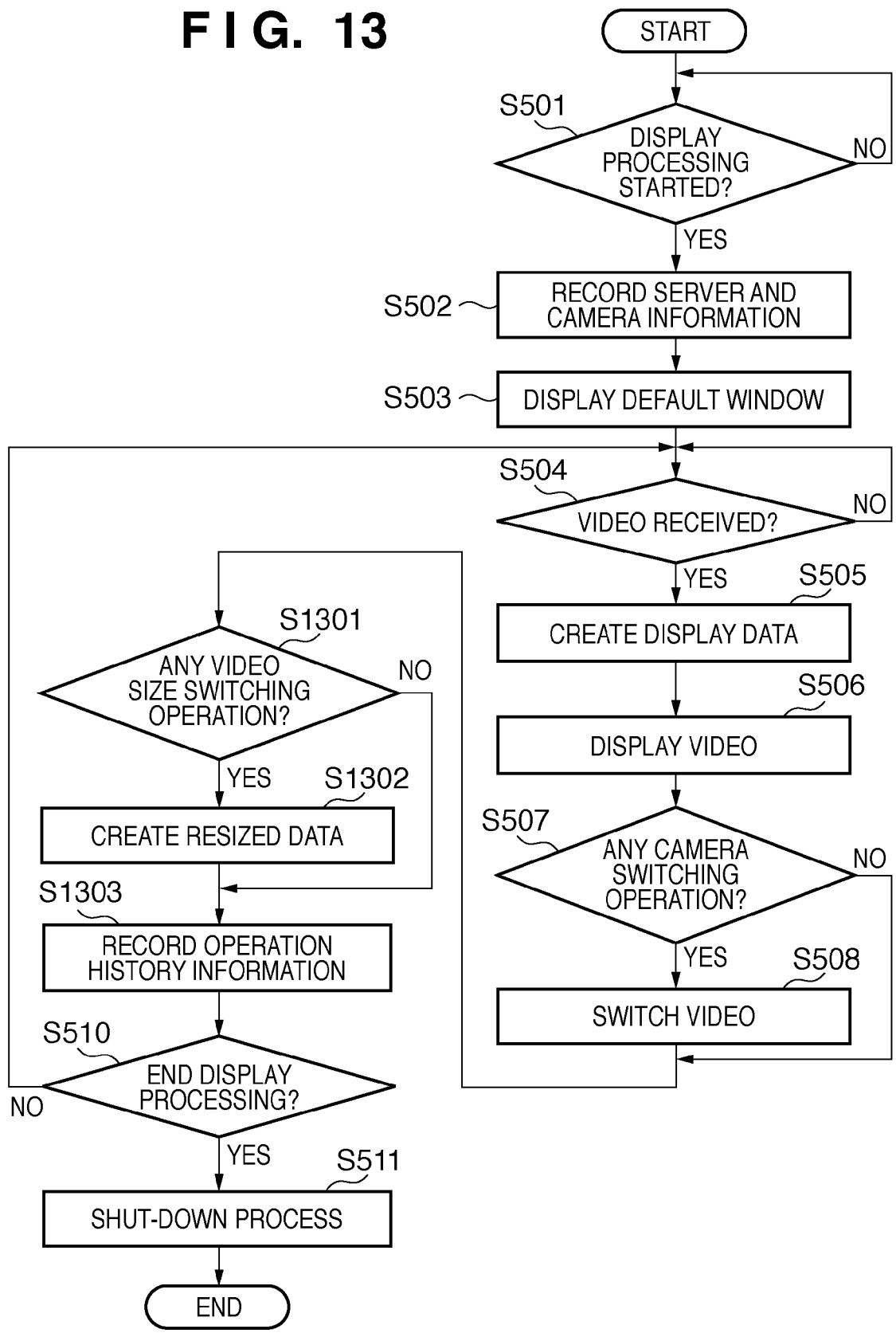
FIG. 13 is an operation flowchart of live video display processing on the display terminal apparatus according to the third embodiment.

FIG. 13 shows an operation flowchart of live video display processing according to the third embodiment.

After step S507 or S508, the control unit 102 determines in step S1301 whether a video size switching operation (also referred to as a size switching operation) has been performed by the user via the operation unit 110. If it is determined that a size switching operation has been performed, the control unit 102 goes to step S1302. In step S1302, the control unit 102 switches the video size based on the size switching operation. In step S1303, the control unit 102 records history of the camera switching operation and video size switching operation in the recording unit 105 using the format shown in FIG. 12.

That part of the operation flowchart which corresponds to the redisplay processing is the same as the first embodiment. That is, in the redisplay processing, if information about a video size switching operation is contained in the history information 108, the control unit 102 issues a command to the server 209 so that the video data received by the video receiving unit 101 will conform to the video size resulting from the video size switching.

In the third embodiment, a video size switching operation for the video data being displayed has been illustrated as a user operation. According to the third embodiment, even when a camera is capable of delivering plural sizes of video, by recording the sizes of received video, it is possible to reproduce the video under conditions equivalent to those of the live video display processing.

Of course, the embodiments described above may be used in combination. Also, although operations (trimming and resizing) related to video display have been described as user operations, if audio information is attached to the video data, volume adjustment and the like can be treated as user operations.

Embodiments of the present invention have been described above, and the present invention may be embodied, for example, in the form of a system, apparatus, method, program, recording medium, or the like. Specifically, the present invention may be applied either to a system consisting of multiple apparatus or to equipment consisting of a single apparatus.

Incidentally, the present invention can also be achieved by a configuration in which a software program that implements the functions of the embodiment described above is supplied to a system or apparatus either directly or remotely and a computer in the system or apparatus reads out and executes the supplied program code. In that case, the program supplied is a computer program which corresponds to the illustrated flowcharts according to the embodiments.

Thus, the program code itself installed on the computer to implement the functions and processes of the present invention on the computer also implements the present invention. That is, the present invention also includes the computer program which implements the functions and processes of the present invention.

In that case, the program code may take any form including object code, programs executed by an interpreter, and script data supplied to an OS as long as it has program functions.

Examples of the storage medium used to supply the computer program include, a floppy (registered trademark) disk, hard disk, optical disk, magneto-optical (MO) disk, CD-ROM, CD-R, CD-RW, magnetic tape, non-volatile memory card, ROM, and DVD (DVD-ROM and DVD-R).

Besides, the program can also be supplied via an Internet homepage. In that case, the user is supposed to connect to an Internet homepage using a browser on a client computer and download the computer program of the present invention onto a recording medium such as a hard disk. The program may be downloaded as a compressed self-installing file. Also, the program code of the program according to the present invention may be divided into multiple files, which can be downloaded from respective homepages. That is, the present invention also includes WWW servers which allow multiple users to download program files capable of implementing the functions and processes of the present invention on a computer.

The present invention may also be distributed to users as a storage medium such as a CD-ROM containing the program of the present invention in encrypted form. In that case, only the users who satisfy predetermined conditions are provided with key information for decryption through a download from an Internet homepage and allowed to decrypt and install the program in executable form on a computer using the key information.

The functions of the above embodiments may be implemented not only by the program read out and executed by the computer, but also in conjunction with an OS or the like running on the computer. In that case, the functions of the above embodiments are implemented by part or all of the actual processing executed by the OS or the like in accordance with instructions from the program.

Furthermore, the functions of the above embodiments may also be implemented by part or all of the actual processing executed by a CPU or the like contained in a function expansion board inserted in the computer or a function expansion unit connected to the computer if the processing is performed in accordance with instructions from the program that has been read out of the storage medium and written into memory on the function expansion board or unit.

The present invention allows a video displayed before to be displayed again under the same conditions as before on each display terminal apparatus using almost the same recording capacity as conventional display terminal apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-042067, filed Feb. 22, 2008, which is hereby incorporated by reference herein in its entirety.

What is claimed is:

1. A display processing apparatus comprising:
a reception unit configured to receive live video data from a plurality of video sending apparatuses;
a display processing unit which is processor-implemented and which is configured to perform display processing of the live video data received by said reception unit in a plurality of windows;
a detecting unit which is processor-implemented and which is configured to detect a user's switching operation for designating one of the plurality of windows and switching from one of the plurality of video sending apparatuses to another one of the plurality of video sending apparatuses from which the live video data is to be displayed in the designated window;
a recording unit which is processor-implemented and which is configured to record history information about the switching operation, wherein the history information includes: (a) an operation time when the switching operation is detected during the display processing of the live video data by said display processing unit; (b) an indication of the another one of the plurality of video sending apparatuses, which is specified by the switching operation; and (c) the designated window; and
a playback control unit which is processor-implemented and which is configured to (a) perform a control for obtaining video data from a video recording apparatus which records the live video data received from the plurality of video sending apparatuses, wherein said playback control unit switches video data displayed in a window designated by the history information to recorded video data corresponding to the live video data received from the another one of the plurality of video sending apparatuses indicated by the history information at a timing corresponding to the operation time indicated by the history information, and (b) perform display processing of the video data obtained from the video recording apparatus.

2. The apparatus according to claim 1, wherein, in case where a video processing operation for instructing to apply a video processing to the video data and display the video data subjected to the video processing is detected while said display processing unit is displaying the video data received by said reception unit, said recording unit further records the video processing operation and its operation time as the history information, and
wherein said playback control unit applies the video processing to received video data and displays processed video data in accordance with operation time and video processing indicated by the history information.

3. The apparatus according to claim 2, wherein the video processing operation includes at least a video trimming processing operation or a video resizing processing operation.

4. The apparatus according to claim 1, wherein, in case where a video processing operation for instructing to apply a video processing to the video data and display the video data subjected to the video processing is detected while said display processing unit is displaying the video data received by said reception unit, said recording unit further records the video processing operation and its operation time as the history information, and
wherein said playback control unit sends to the video recording apparatus a command in accordance with the video processing operation and its operation time indicated by the history information, wherein the command instructs the video recording apparatus to perform video processing corresponding to the video processing operation, and receives and displays processed video data from the video recording apparatus.

5. The apparatus according to claim 4, wherein the video processing operation includes at least a video trimming processing operation or a video resizing processing operation.

6. The apparatus according to claim 1, wherein the plurality of video sending apparatuses comprise a plurality of video cameras that include a first video camera that is able to send a plurality of video data corresponding to a plurality of sizes,
wherein said recording unit records, if a size switching operation for switching the size of a video to be received from the first video camera is detected, the size switching operation and its operation time as history information, and
wherein said playback control unit switches the video data received from the video recording apparatus storing the plurality of video data corresponding to the plurality of sizes received from the first video camera, in accordance with the size switching operation indicated by the history information.

7. A control method for a display processing apparatus, comprising:
a reception step of receiving live video data from a plurality of video sending apparatuses;
a display processing step of performing display processing of the live video data received by said reception step in a plurality of windows;
a detecting step of detecting a user's switching operation for designating one of the plurality of windows and switching from one of the plurality of video sending apparatuses to another one of the plurality of video sending apparatuses from which the live video data is to be subjected to the display processing in the designated window;
a recording step of recording history information about the switching operation, wherein the history information includes: (a) an operation time when the switching operation is detected during the display processing of the live video data by said display processing step; (b) an indication of the another one of the plurality of video sending apparatuses, which is specified by the switching operation; and (c) the designated window; and a playback control step of (a) performing a control for obtaining video data from a video recording apparatus which records the live video data received from the plurality of video sending apparatuses, wherein said playback control step switches video data displayed in a window designated by the history information to recorded video data corresponding to the live video data received from the another one of the plurality of video sending apparatuses indicated by the history information at a timing corresponding to the operation time indicated by the history information, and (b) performing display processing of the video data obtained from the video recording apparatus.

8. A program stored in a non-transitory computer readable medium, which makes a computer execute the control method according to claim 7.

9. The method according to claim 7, wherein, in case where a video processing operation for instructing to apply video processing to the video data and display the video data subjected to the video processing is detected while the video data received in said reception step is being displayed in said display processing step, said recording step further records the video processing operation and its operation time as the history information, and
wherein said playback control step applies the video processing to received video data and displays processed video data in accordance with the operation time and the video processing indicated by the history information.

10. The method according to claim 9, wherein the video processing operation includes at least a video trimming processing operation or a video resizing processing operation.

11. The method according to claim 7, wherein, in case where a video processing operation for instructing to apply a video processing to the video data and display the video data subjected to the video processing is detected while the video data received in said reception step is being displayed in said display processing step, said recording step further records the video processing operation and its operation time as the history information, and
wherein said playback control step sends to the video recording apparatus a command in accordance with the video processing operation and its operation time indicated by the history information, wherein the command instructs the video recording apparatus to perform video processing corresponding to the video processing operation, and receives and displays processed video data from the video recording apparatus.

12. The method according to claim 11, wherein the video processing operation includes at least a video trimming processing operation or a video resizing processing operation.

13. The method according to claim 7, wherein the plurality of video sending apparatuses comprise a plurality of video cameras that include a first video camera that is able to send a plurality of video data corresponding to a plurality of sizes,
wherein said recording step records, if a size switching operation for switching the size of a video to be received from the first video camera is detected, the size switching operation and its operation time as history information, and
wherein said playback control step switches the video data received from the video recording apparatus storing the plurality of video data corresponding to the plurality of sizes received from the first video camera, in accordance with the size switching operation indicated by the history information.

14. A display processing system which includes a plurality of video sending apparatuses, a video recording apparatus which records video sent from the plurality of video sending apparatuses, and a display processing apparatus which performs display processing of video sent from the plurality of video sending apparatuses and said video recording apparatus, the display processing apparatus comprising:
a reception unit which is processor-implemented and which is configured to receive live video data sent from the plurality of video sending apparatuses;
a display processing unit which is processor-implemented and which is configured to perform display processing of the live video data received by said reception unit in a plurality of windows;
a detecting unit which is processor-implemented and which is configured to detect a user's switching operation for designating one of the plurality of windows and switching from one of the plurality of video sending apparatuses to another one of the plurality of video sending apparatuses from which the live video data is to be subjected to the display processing in the designated window;
a recording unit which is processor-implemented and which is configured to record history information about the switching operation, wherein the history information includes: (a) an operation time when the switching operation is detected during the display processing of the live video data by said display processing unit; (b) an indication of the another one of the plurality of video sending apparatuses, which is specified by the switching operation; and (c) the designated window; and
a control unit which is processor-implemented and which is configured to perform a control for obtaining video data from the video recording apparatus, wherein said control unit switches video data displayed in a window designated by the history information to recorded video data corresponding to the live video data received from the another one of the plurality of video sending apparatuses indicated by the history information at a timing corresponding to the operation time indicated by the history information,
wherein said display processing unit performs display processing of the video data obtained from the video recording apparatus.

* * * * *